United States Patent
Poliak

(10) Patent No.: US 9,224,404 B2
(45) Date of Patent: Dec. 29, 2015

(54) DYNAMIC AUDIO PROCESSING PARAMETERS WITH AUTOMATIC SPEECH RECOGNITION

(71) Applicant: QNX Software Systems Limited, Kanata (CA)

(72) Inventor: Anthony Andrew Poliak, Lake Stevens, WA (US)

(73) Assignee: 2236008 Ontario Inc., Waterloo, Ontario (CA)

( * ) Notice: Subject to any disclaimer, the term of this patent is extended or adjusted under 35 U.S.C. 154(b) by 237 days.

(21) Appl. No.: 13/751,724

(22) Filed: Jan. 28, 2013

(65) Prior Publication Data

US 2014/0214414 A1    Jul. 31, 2014

(51) Int. Cl.
*G10L 21/0208* (2013.01)
*G10L 15/30* (2013.01)
*G10L 15/20* (2006.01)

(52) U.S. Cl.
CPC ............ *G10L 21/0208* (2013.01); *G10L 15/30* (2013.01); *G10L 15/20* (2013.01)

(58) Field of Classification Search
USPC .......................................... 704/275, 240, 228
See application file for complete search history.

(56) References Cited

U.S. PATENT DOCUMENTS

| 7,324,940 B1 * | 1/2008 | Miller et al. ................... 704/240 |
| 2003/0191646 A1 | 10/2003 | D'Avello et al. |
| 2005/0027539 A1 * | 2/2005 | Weber et al. ................... 704/275 |
| 2008/0300025 A1 * | 12/2008 | Song et al. ................. 455/569.1 |
| 2010/0330908 A1 * | 12/2010 | Maddern et al. ............. 455/41.2 |

FOREIGN PATENT DOCUMENTS

JP    2003-274003 A    9/2003

OTHER PUBLICATIONS

Bluetooth, "Hands-Free Profile 1.5," Bluetooth Specification, Revision V10r00, Car Working Group, Nov. 25, 2005, pp. 1-93.

* cited by examiner

*Primary Examiner* — Jeremiah Bryar
(74) *Attorney, Agent, or Firm* — Brinks Gilson & Lione

(57) ABSTRACT

A communication system includes a front-end audio gateway or bridge and a hands-free device. An automatic speech recognition platform accessible to the hands-free device provides or makes available one or more preprocessing schemes and/or acoustic models to the front-end audio gateway or bridge. The preprocessing schemes or acoustic models can be identified by or provided before a connection is established between the front-end audio gateway and the automatic speech recognition platform, when a connection occurs between the front-end audio gateway and the automatic speech recognition platform, and/or during a speech recognition session.

5 Claims, 4 Drawing Sheets

DYNAMIC AUDIO PROCESSING PARAMETERS WITH AUTOMATIC SPEECH RECOGNITION

BACKGROUND OF THE INVENTION

1. Technical Field

This disclosure relates to voice recognition and more particularly to improving automatic speech recognition through selections of preprocessing profiles and/or acoustic models.

2. Related Art

Automatic speech recognition attempts to determine what words, phrases, or sentences are spoken. When sources are distant, desired speech signals may include interference and reverberation.

In some automatic speech recognition applications, echo cancellation and noise reduction attempts to remove interference and reverberation. Because some noise reduction techniques assume interference and reverberation to be very similar regardless of a speaker's environment, some echo cancellation and noise reduction implementations attenuate or suppress speech, before it is processed by an automatic speech recognition application. The result may be an unreliable recognition result caused by an improper preprocessing of the input signal.

BRIEF DESCRIPTION OF THE DRAWINGS

The inventions can be better understood with reference to the following drawings and description. The components in the figures are not necessarily to scale, emphasis instead being placed upon illustrating the principles of the inventions. Moreover, in the figures, like referenced numerals designate corresponding parts throughout the different views.

DETAILED DESCRIPTION OF THE PREFERRED EMBODIMENTS

A communication system delivers an accurate automatic speech recognition result through a selection of a preprocessing scheme or an acoustic model. The recognition result may comprise indicia, symbols, objects, or other agnostic representations that may interface the sending device, receiving device, or a receiving software application stored on a non-transitory media.

Some communication systems include a real-time preprocessor within a front-end audio gateway or bridge (hereinafter the front-end audio gateway or audio gateway) that preprocesses a speech utterance and reliably passes targeted speech to a remote speech recognition engine resident to, integrated with, a unitary part of, or interfaced to an automatic speech recognition platform. When a connection is established between the remote speech recognition engine and the front-end audio gateway, before a connection occurs (e.g., during a pairing process of an automatic speech recognition platform to the front-end audio gateway), or during a speech recognition session, the remote speech recognition engine provides or identifies the preprocessing scheme(s) or acoustic model(s) that may reliably pass a targeted speech to the remote speech recognition engine. The preprocessing scheme may comprise a catalog of processing profiles, a detailed parametric session file, a customized hands-free profile, a scheme that generates, enables or disables selectable attenuations, selectable signal processing, and/or selectable filters, etc. or any combination thereof that preprocesses the input in a predesired way.

Some preprocessing schemes selectively enable or disable some or all of the noise reduction features available to or provided by the front-end audio gateway when voice recognition is requested. Some preprocessing schemes dynamically adjust the signal processing of the front-end audio gateway to the changing processing requirements of the remote speech recognition engine or the changing processing requirements of a remote destination. The adjustment may occur in real-time and may be tuned or adjusted to the front-end audio gateway's environment. When speech recognition is not requested or when selectable preprocessing is not needed, the noise reduction capabilities of the front-end audio gateway may be fully enabled to enhance the clarity and intelligibility of speech or audio that may be conveyed to a listener or transmitted to another remote application or destination.

Figure 1:
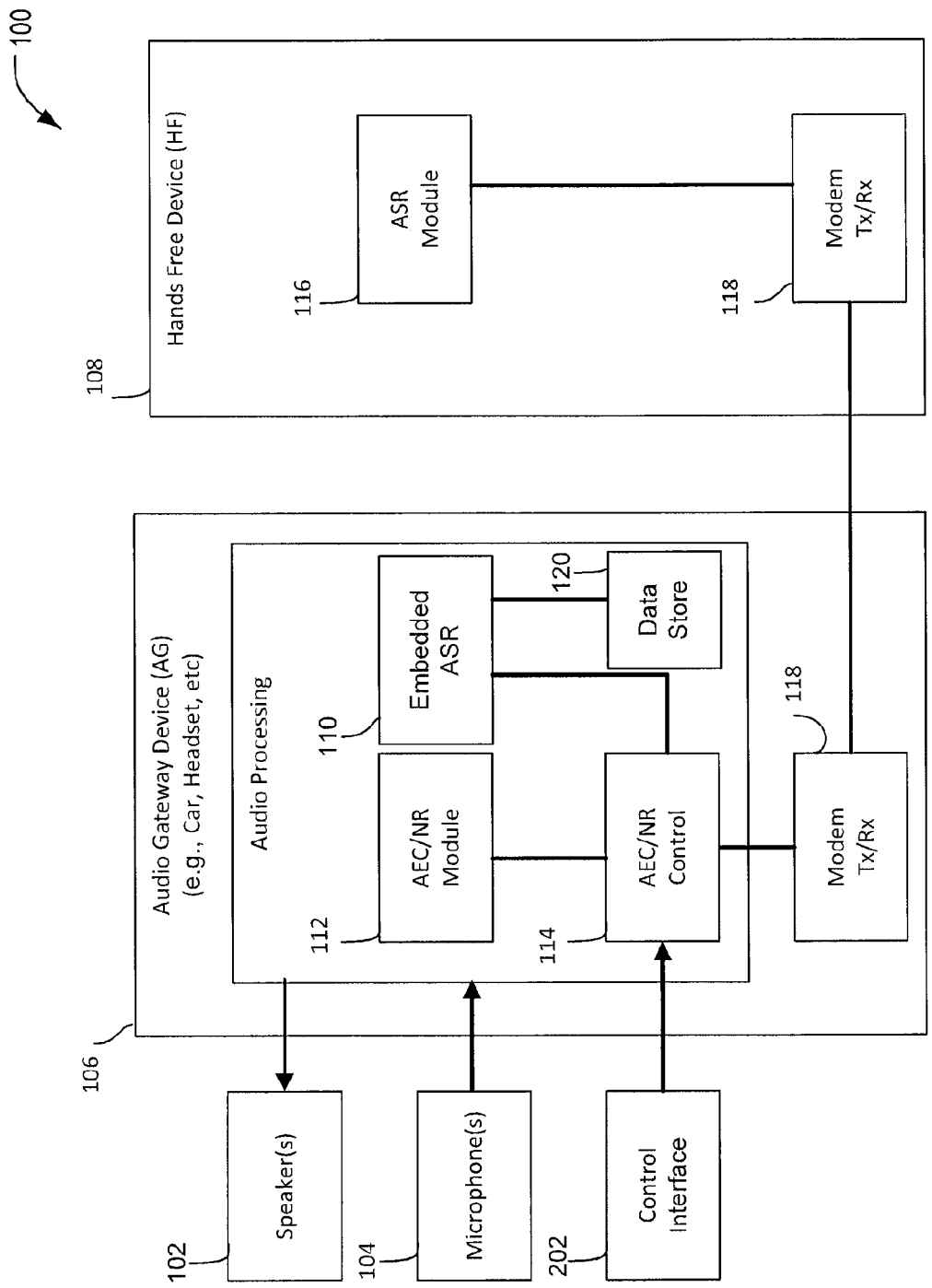
FIG. 1 is a block diagram of a communication system.

FIG. 1 shows a communication system 100. An audio gateway 106 connects disparate communication devices by converting input audio signals into compatible forms with the protocol used by a receiving network and a device like a hands-free device 108. The hands-free-device 108 shown in FIG. 1 may include wireless devices, smart phones, in-vehicle devices, mobile devices, cloud-based devices, etc. These devices may act as a transmission point (e.g., a receiving and/or transmitting node) to and from networks, devices, or applications. The hands-free device 108 and the audio gateway 106 may be long-range and/or short-range network enabled and support one or more wireless protocols including for example, GSM ("Global System for Mobile Communication"), GPRS (General Packet Radio Service), CDMA (Code Division Multiple Access), Bluetooth RTM (IEEE 802.15, 802.15.4 (TG4), 802.15.3 (TG3)), Mobile Broadband Wireless Access (IEEE 802.20), Ultrawideband (IEEE 802.15.3a), Wi-Fi (IEEE 802.11b, g, n), WiMax (IEEE 802.16), mobile WiMax (IEEE 802.16 e, m), and/or satellite, etc. or a combination thereof, which are incorporated by reference.

In operation, the audio gateway 106 receives digital or analog signals from one or more microphone(s) 104. The speech, noise, or combination that comprises an audio input may be processed by a preprocessor, such as a processor that emulates an Audio Echo Cancellation/Nose reduction (AEC/NR) module 112. The controller shown as the AEC/NR control 114, controls what signals pass to the hands-free device 108 through the selection of a preprocessing scheme and/or acoustic model. The preprocessing scheme (or attenuation scheme) may comprise a catalog of processing profiles that enables or disables some or all of the noise processing capabilities of the audio gateway 106, a parametric session file, a customized hands-free profile, a scheme that generates, enables or disables selectable attenuations, selectable signal processing, or selectable filters, etc., or a combination thereof that are provided by, made accessible to, or identified by or through the hands-free device 108, but selected by and implemented by the logic or applications resident to the audio gateway 106.

In some communication systems 100 the implemented preprocessing scheme and/or acoustic model in the audio gateway 106 is selected through a microphone 104 and an embedded speech engine 110 (e.g., a grammar based speech engine) within the audio gateway 106. The microphone 104 collects spoken utterances and passes the utterances to the embedded speech engine 110. When the speech engine 110 matches a spoken utterance to a grammar, the speech engine 110 recognizes and identifies an audio event or trigger event, which indicates a request for a speech recognition session. The audio event or trigger event enables the selection of a preprocessing scheme or an acoustic model provided by, made accessible to, or identified by a remote ASR module 116. The grammars or grammar file retained in a data store 120 of the audio gateway 106 comprise keywords, key phrases, and in some instances, programming logic that uniquely identifies the preprocessing schemes and/or acoustic models implemented by the AEC/NR module 112. The recognition results generated by the embedded speech engine 110 may be translated by the AEC/NR control 114 into a selection of a preprocessing profile or acoustic model based on two confidence scores: one that speech recognition was requested and two, that the results returned by the speech engine 110 in the audio gateway 106 matches the words that were spoken.

In FIG. 1, the remote ASR module 116 shown in the hands-free device 108 may be network or cloud-based. The remote ASR module 116 identifies the preprocessing schemes and/or acoustic models associated with the recognition results returned by the embedded speech engine 110. The identification and availability of the selectable preprocessing schemes or acoustic models may occur when a connection is established between the audio gateway 106 and the hands-free device 108, before a connection occurs (e.g., during the pairing process of the audio gateway 106 and the hands-free device 108), during one or more speech recognition sessions, and/or etc. Because the remote ASR 116 is off of the audio gateway 106, the preprocessing schemes and/or acoustic models available to the AEC/NR module 112 and AEC/NR control 114 may be updated continuously (e.g., in real-time) or periodically to improve voice recognition capabilities of current and legacy audio gateways 106. A real-time operation may comprise an operation matching a human's perception of time or a virtual process that is processed at the same rate (or perceived to be at the same rate) as a physical or an external process without an intentional delay.

While the embedded speech engine 110 may comprise a grammar-based platform or a grammar-based speech engine, in FIG. 1, the remote ASR 116 may comprise a natural language-based speech engine or platform. The natural language-based speech engine or platform 116 matches the sound parts of the preprocessed signal against a natural language vocabulary that may be stored locally in a memory or database, or may be remote from the hands-free device 108 and audio gateway 106 in the cloud or in a cloud-based computing system. Because some natural language based systems encourage users to speak naturally, the natural language-based speech engine or platform 116 may include a dictionary or a large data set used by the natural language-based speech engine or platform 116. Some natural language-based speech engines or platforms 116 may access multiple grammars that may be activated independently or in response to an application request. Because a vocabulary may comprise all of the words in the active grammars that may be matched to a spoken utterance, the natural language-based vocabulary may be much larger than the embedded speech engine's 110 vocabulary or grammars. As described, the natural language-based speech engine or platform 116 and the grammar based embedded speech engine 110 may comprise a specifically programmed processor or software stored on a tangible media that recognizes speech.

Figure 2:
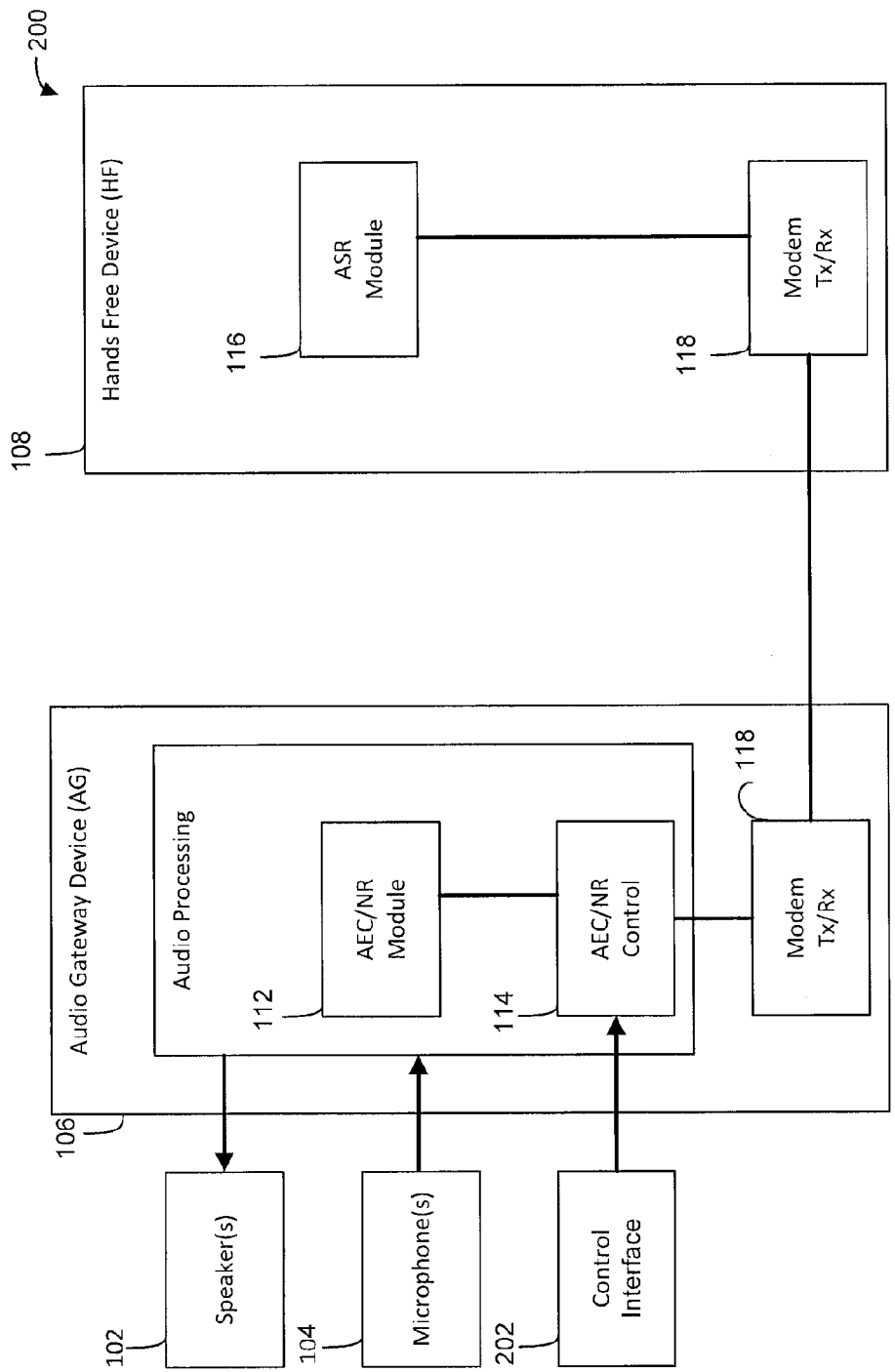
FIG. 2 is a block diagram of an alternate communication system.

The automated mode control of the audio gateway 106 established by the embedded speech engine 110 in FIG. 1 may be replaced by a user's physical selection via a control interface 202 that may include a touchscreen, a keyboard, a button selection and/or an optional proximity detector connected to the audio-gateway 106 in FIG. 2. The detections of a user's selections via the control interface 202 may establish a request for a speech recognition session in some communication systems 200 that tune the preprocessing schemes and/or acoustic model(s) to the remote speech engine or platform's 116 input requirements.

Figure 3:
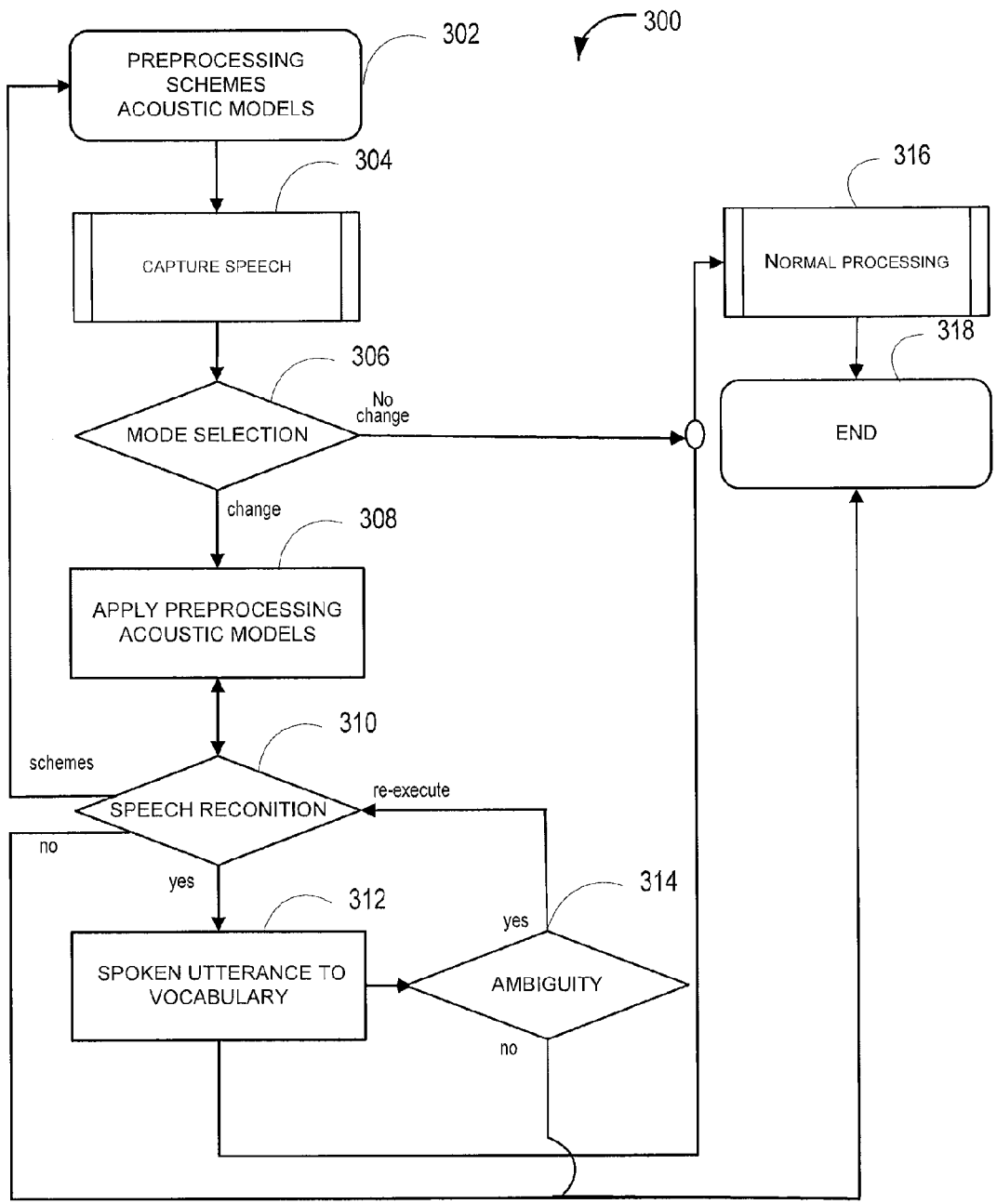
FIG. 3 is a communication flow diagram.

FIG. 3 is a flow diagram of the communication process 300. When the audio gateway 106 and hands-free device 108 device are on-line and reach a running state, a remote automatic speech recognition process (via transceivers shown as 118 in FIGS. 1 and 2) identifies, transfers, or makes available selectable preprocessing schemes or acoustic models that may be implemented by the audio gateway 106 at 302. Speech is captured, translated into analog/digital data or frames of data at 304 and a grammar-based embedded speech process compares the spoken utterances to a vocabulary (e.g., speaker dependent, task specific, etc.) or grammar and passes its recognition results and confidence score to control logic (e.g., the process executed by the AEC/NR control 114) to determine a mode selection at 306. The operational state of the audio gateway 106 or mode may be based on the recognition results received from the grammar-based embedded speech process and control logic within the audio gateway 106.

When the control logic recognizes an audio event or trigger event such as a request for speech recognition, the control logic enables or selects a preprocessing scheme or an acoustic model to process the digital or analog signals received from an input at 308 before transmitting the preprocessed digital or analog signals to the remote automatic speech recognition process. The preprocessing scheme or an acoustic model are provided by, made accessible to, or identified by the remote automatic speech recognition process at 310.

An automatic speech recognition process compares the preprocessed digital or analog signals to a vocabulary such as a natural language vocabulary at 312. The natural language recognition results may include confidence scores. The confidence scores may reflect the likelihood that each of the words and phrases match the natural language recognition results. In some processes the grammar/vocabulary used by the automatic speech recognition process may not be exposed to processes outside of the automatic speech recognition processing platform. The natural language grammar/vocabulary may be network-based or cloud-based and thus, may be physically separate from the audio gateway 106 and/or the hands-free device 108.

When the automatic speech recognition process's natural language confidence scores do not exceed a predetermined threshold or an ambiguity cannot be resolved at 314, the preprocessed analog/digital data or frames may be reprocessed at 310 or may prompt a user (e.g., via loud speaker(s) 102 in FIGS. 1 and 2) to repeat his or her utterance. When speech recognition is not requested, the noise reduction capabilities of the communication process may be fully enabled at 316 to enhance the clarity and intelligibility of speech or audio that may be conveyed to a listener through a phone call or transmitted to another remote application or destination.

Figure 4:
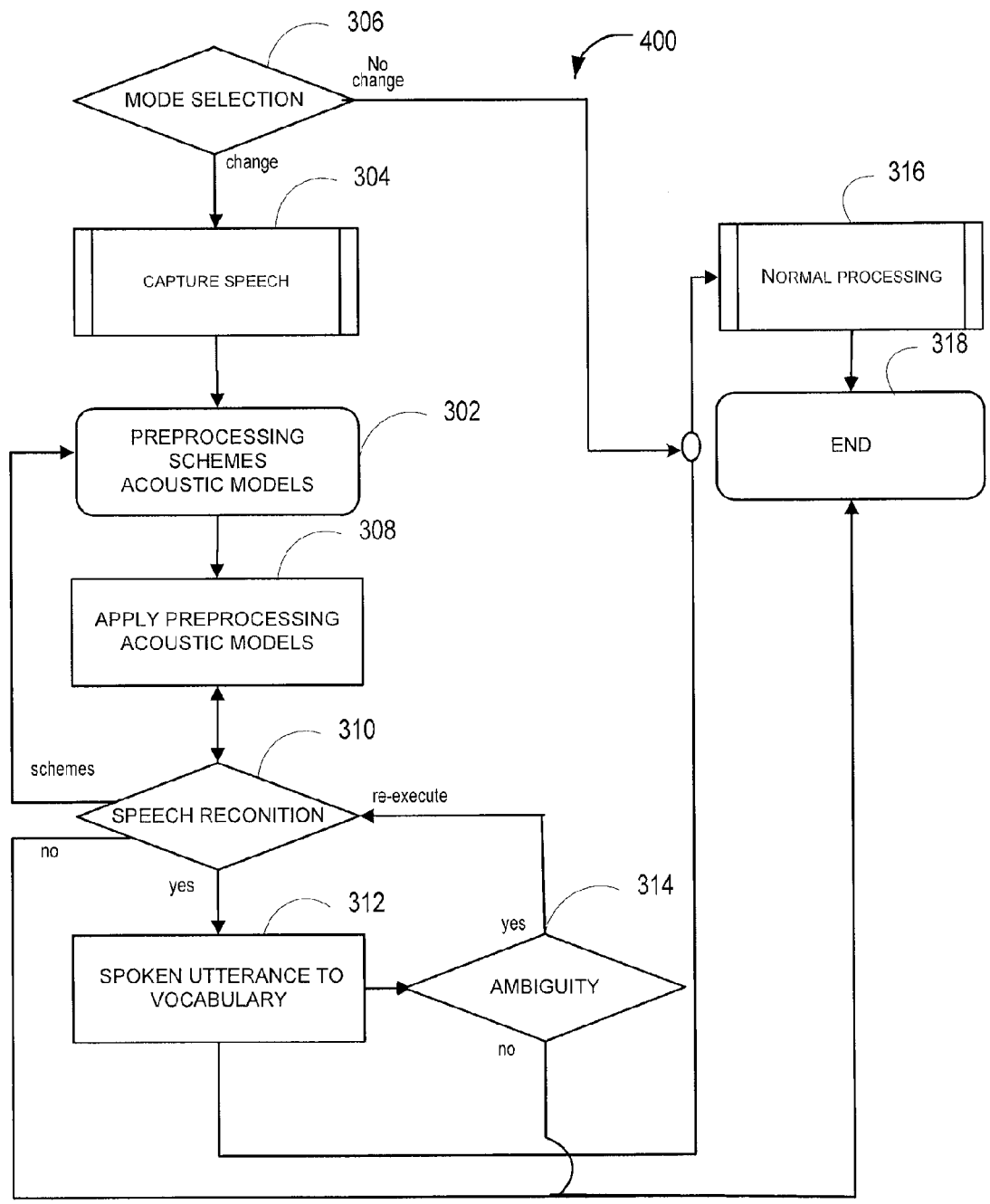
FIG. 4 is an alternate communication flow diagram.

In FIG. 4, the automated mode control process established by a grammar-based embedded speech process may be replaced by a process that begins by detecting a user's physical selection at 306 that may include a user's touch on a touchscreen, a keyboard, a button and/or a user's proximity to a selectable icon on a display. The respective selections establish a request for speech recognition in some communication systems 400 that tune the preprocessing schemes and/or acoustic model(s) to the remote automatic speech recognition process requirements. Each of physical or manual events increase the probability that the results returned by the automatic speech recognition process 400 matches what the speaker said. The improved results of these processes 400 are maintained when the sequence that comprises the process varies. In some alternate communication processes, the acts that comprise 302-306 occur in any order and may include intermediate acts, and the automatic speech recognition process 310 may use a grammar-based speech engine. Some communication processes (and systems described with respect to FIGS. 1 and 2) provide logic for the front-end process or audio gateway 106 to request a recognition session that is stateful, in which the controlling process (e.g., the process executed by the AEC/NR control 114) separate from and remote from automatic speech recognition process executed by the ASR module 116 temporarily or permanently monitors the details of the state of the users session and saves that information in the data store 120. The session may be reinstated automatically for example, when event such as on power up or power-on event occurs.

Each of the systems, engines, methods, and descriptions described may stand alone each may be encompassed within other systems and applications including headless units and head units in vehicles, wireless devices, smart phones, etc. Other systems may include combinations of structure and functions described above or shown in one or more of the figures and may be used in many environments. When used in a vehicle environment, for example, the AEC/NR module 112 may reduce in-vehicle interference and reverberation through a knowledge base of the environmental characteristics of the audio gateway 106 that may include knowledge of the reverberation time, knowledge of the microphones 104/speaker 102 placement, and knowledge of driver location to reduce in-vehicle echo and noise stored in the data store 120. Analytical rules or commands delivered through a Bluetooth hands-free profile and originating from or received through the hand-free device 108 or specifically from the ASR module 116 may modify or turn off the echo cancellation and/or noise reduction capabilities of the AEC/NR module 112 when automated speech recognition is requested. Turning off or modifying the parameters of the AEC/NS module 112 that are known to interfere with automated speech recognition may improve the confidence scores of the ASR module 116.

The system, engines, methods, and descriptions described may also be programmed in one or more controllers, devices, signal processors, and one or more processors and a coprocessor (e.g., a coprocessor is a processor distinct from a main processor, that performs additional functions to assist the main processor). The processors may be arranged in a parallel processing structure and/or multiprocessing structure. Alternatively, each of the engines and controllers described herein may run on virtual machines in which one, two, etc. or all of the engines are isolated on a complete system platform that supports the execution of a separate operating system. The virtual machines may be limited to the resource and abstractions provided by the particular virtual machine. Some virtual machines may not break out of their isolated virtual worlds to access resources. In yet another alternative, the grammar-based speech engines, natural language speech engine, etc., may be executed by a multitasking processor executing multiple computer threads (e.g., multithreading).

In yet another alternative, each of the ASR's 110 and 116 may be executed by a single speech engine or a single ASR platform accessible to the audio gateway 106 and hands-free device 108, respectively, that compares a spoken utterance to different vocabularies (e.g., such as a grammar-based vocabulary in the audio gateway 106 and a natural-language based vocabulary in the hands-free device 108). The vocabularies may comprise active grammar words and phrases. Thus, if an exemplary FIG. 1 were implemented by one speech engine, the speech engine would access two vocabularies: 1) a reduced grammar or sub-grammar vocabulary; and 2) a natural language vocabulary. Logic interfaced to or a unitary part of the speech recognition engine may activate or deactivate the words (e.g., by rules within the grammar) and/or phrases.

The engines may comprise a processor or a portion of a program that executes or supports the communication systems or process. The processor may comprise one, two, or more central processing units that execute the instruction code, mine speech data, and access data from memory that generate, support, and/or complete an operation, compression, or signal modifications. The applications may support and define the functions of a specific processor that is customized by instruction code (and in some applications may be resident to any speech recognition enabled systems that may include vehicles, communication systems, audio systems, telephones, teleconferencing systems, etc.).

In some applications, the systems, methods, engines, and descriptions may be encoded in a non-transitory signal bearing storage medium, a computer-readable medium, or may comprise logic stored in a memory that may be accessible through an interface and is executable by one or more processors. Some signal-bearing storage medium or computer-readable medium comprise a memory that is unitary or separate (e.g., local or remote) from the speech recognition enabled devices such as such as cell phones, wireless phones, personal digital assistants, two-way pagers, smartphones, portable computers, vehicle based devices, and any other devices that interface or include communication technology. If the descriptions or methods are performed by software, the software or logic may reside in a memory resident to or interfaced to the one or more processors, devices, or controllers that may support a tangible or visual communication interface (e.g., to a display), wireless communication interface, or a wireless system.

The memory may retain an ordered listing of executable instructions for implementing logical functions. A logical function may be implemented through digital circuitry, through source code, or through analog circuitry. A "computer-readable storage medium," "machine-readable medium," "propagated-signal" medium, and/or "signal-bearing medium" may comprise a non-transitory medium that stores software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber.

A machine-readable medium may also include a tangible medium, as the software may be electronically stored as an image or in another format (e.g., through an optical scan), then compiled, and/or interpreted or otherwise processed. The processed medium may then be stored in a memory or database accessible by a database engine that provides access to a database management system. When such devices are responsive to such commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action "(i.e., the device's response) to . . ." merely follow another action.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

What is claimed is:

1. A communication system comprising:
   an audio-gateway that converts input audio signals into a compatible form used by a receiving network;
   a noise reduction module resident to the audio gateway configured to reduce in-vehicle echo and noise; and
   a speech recognition engine remote from the audio gateway generates and transmits commands through a wireless network that cause the audio gateway to modify the audio gateway's noise reduction processing state in response to a recognized request at the audio gateway for an automated speech recognition;
      where the noise reduction module applies knowledge of a reverberation time, knowledge of a plurality of microphone placement, and knowledge of driver's location stored in a data store to reduce the in-vehicle echo and noise.

2. A communication process comprising:
   transferring a plurality of preprocessing schemes or acoustic models that can be implemented by an audio gateway through a short-range network;
   comparing a spoken utterances to a grammar-based vocabulary to generate a recognition result and a confidence score at the audio gateway; and
   selecting one of the plurality of preprocessing schemes or acoustic models by a automatic speech recognition process remote from the audio gateway based on the recognition result and the confidence score when the recognition result and the confidence score indicates a request for an automated speech recognition.

3. The communication process of claim 2 where the transfer of the plurality of preprocessing schemes or acoustic models occurs during a speech recognition session.

4. A communication system comprising:
   an audio-gateway that converts input audio signals into a compatible form used by a receiving network;
   a noise reduction module resident to the audio gateway configured to reduce in-vehicle echo and noise; and
   a speech recognition engine remote from the audio gateway generates and transmits commands through a wireless network that cause the audio gateway to modify the audio gateway's noise reduction processing state in response to a request for an automated speech recognition
   where the noise reduction module applies knowledge of a reverberation time, knowledge of a plurality of microphone placement, and knowledge of driver's location stored in a data store to reduce the in-vehicle echo and noise.

5. A communication process comprising:
   transferring a plurality of noise or echo preprocessing schemes that are implemented by an audio gateway in response to commands received through a short-range network and the detection of a speech event at the audio gateway;
   comparing a spoken utterances to a grammar-based vocabulary to generate a recognition result and a confidence score at the audio gateway; and
   selecting one of the plurality of the nose or echo preprocessing schemes in response to an automatic speech recognition process remote from the audio gateway based on the recognition result and the confidence score when the recognition result and the confidence score indicates a request for automated speech recognition.

* * * * *